US009004243B2

(12) United States Patent
Nehl et al.

(10) Patent No.: US 9,004,243 B2
(45) Date of Patent: Apr. 14, 2015

(54) MAGNETO-RHEOLOGICAL DAMPING ASSEMBLY

(75) Inventors: Thomas Wolfgang Nehl, Shelby Township, MI (US); Robert T. Foister, Rochester Hills, MI (US); Frederic Bailly, Paris (FR); Guy Tessier, Fontenay Sous Bois (FR)

(73) Assignee: Beijing West Industries Co., Ltd., Beijing (CN)

( * ) Notice: Subject to any disclaimer, the term of this patent is extended or adjusted under 35 U.S.C. 154(b) by 54 days.

(21) Appl. No.: 14/117,706

(22) PCT Filed: Aug. 5, 2011

(86) PCT No.: PCT/CN2011/078068

§ 371 (c)(1), (2), (4) Date: Nov. 14, 2013

(87) PCT Pub. No.: WO2012/155394

PCT Pub. Date: Nov. 22, 2012

(65) Prior Publication Data

US 2014/0076676 A1 Mar. 20, 2014

Related U.S. Application Data

(60) Provisional application No. 61/486,889, filed on May 17, 2011.

(51) Int. Cl.
*F16F 9/53* (2006.01)

(52) U.S. Cl.
CPC .................................... *F16F 9/535* (2013.01)

(58) Field of Classification Search
CPC ............ F16F 9/53; F16F 9/535; F16F 9/537; F16F 13/30; F16F 13/305
USPC ....................... 188/267, 267.2; 335/230, 268
See application file for complete search history.

(56) References Cited

U.S. PATENT DOCUMENTS

| | | | | |
|---|---|---|---|---|
| 3,460,081 | A * | 8/1969 | Tillman | 335/234 |
| 8,286,763 | B2 * | 10/2012 | Nehl et al. | 188/267.2 |
| 8,878,657 | B2 * | 11/2014 | Periquet et al. | 188/267.2 |
| 2010/0096818 | A1 | 4/2010 | Marjoram et al. | |

FOREIGN PATENT DOCUMENTS

| | | | |
|---|---|---|---|
| CN | 1392354 | A | 1/2003 |
| CN | 1587738 | A | 3/2005 |
| CN | 1621707 | A | 6/2005 |
| CN | 102278409 | A * | 12/2011 |
| EP | 2177784 | A2 | 4/2010 |
| JP | 2009243674 | A | 10/2009 |

* cited by examiner

*Primary Examiner* — Thomas J Williams
(74) *Attorney, Agent, or Firm* — Dickinson Wright PLLC

(57) ABSTRACT

A magneto-rheological damping assembly including a piston (28) defining a core (38). A pair of spaced electromagnets (46) are disposed about the core (38) and are connected to a controller (48) for selectively generating a magnetic flux. A pair of permanent magnets (52) are disposed about the electromagnets (46) and a pole segment (54;154;56;156) is disposed therebetween. A main gap (74) extends through the piston (28) through which magneto-rheological fluid (26) is conveyed. Flux generated by the magnets controls the viscosity of the fluid in the main gap (74) to control the damping force of the assembly. The controller (48) defines an off operating state for cancelling the flux from the permanent magnets (52) across the main gap (74). The core (38) and the pole segment (54;154;56;156) define a closed auxiliary gap (80) extending axially between the electromagnets (46) and radially between the core (38) and the internal pole segment (56) for preventing leakage of flux across the main gap (74) when the assembly is in the off operating state.

19 Claims, 4 Drawing Sheets

20 22 24 78 46 28 80 82 72 74 76 40 A 44 50 42 26 36 34 30 54 38 52 56 58 32

On Operating State

Fail Firm Operating State

Off Operating State

MAGNETO-RHEOLOGICAL DAMPING ASSEMBLY

BACKGROUND OF THE INVENTION

1. Field of the Invention

A magneto-rheological damping assembly.

2. Description of the Prior Art

Magneto-rheological (MR) damping assemblies are well known in the art. Such devices are known and used in the automotive field in vehicle suspension systems in the form of shock absorbers, struts, and other motion or vibration damping structures. MR Dampers use magneto-rheological, or MR fluid, which exhibits a thickening behavior (a rheology change) upon being exposed to magnetic fields of a sufficient strength. The higher the magnetic field strength to which the MR fluid is exposed, the higher the viscosity of the fluid, and the higher the damping force of the device.

One such assembly is shown in U.S. Patent Application 2010/0089711 (Hereinafter known as the '711 application). The '711 application discloses a piston extending along an axis defining a compression end and a rebound end. The piston defines a core. An electromagnet is disposed annularly about and engages the core for selectively generating a magnetic flux. The damping force of the assembly is a function of the current supplied to the electromagnet. To provide for desirable level of damping in the absence of a current to the electromagnet and to reduce the required operating current in the device, a permanent magnet is disposed annularly about the electromagnet for generating a magnetic flux. It is known in the art to include a plurality of electromagnets spaced axially from one another. One such assembly is disclosed in U.S. Pat. No. 6,419,057 (Hereinafter referred to as the '057 patent). The '057 patent further discloses a pole segment, or area constructed of a material having a high magnetic permeability for concentrating the magnetic flux from the electromagnets and permanent magnets, disposed axially between permanent magnets.

The '711 application further discloses a main gap extending axially between the compression end and rebound end of the piston and disposed adjacent a pole segment for conveying the MR fluid through the piston. The flux from the magnets changes the viscosity of the fluid in the main gap to control the damping force of the assembly. To control the magnetic flux generated by the electromagnet, the '711 application discloses a controller. The controller defines an off operating state for applying a negative current through the electromagnets for cancelling the flux from the permanent magnets across the main gap to achieve a low damping force.

The '711 application also discloses an auxiliary gap of a material that is less magnetically permeable than the core of the piston to provide for an area of high magnetic reluctance. This is a necessary element of the design because without the auxiliary gap, when it is desirable for flux to travel across the main gap (when the device is not in the off operating state), most of the flux would get short circuited into the core rather than passing across the main gap, leading to an undesirably small damping force.

An identified problem of the prior art is that due to the location of the auxiliary gap, sufficient cancellation of the flux across the main gap is not attainable in the off-operating state due to a leakage of flux from the permanent magnets across the main gap. This is particularly problematic because it results in an undesirably high damping force when the assembly is in the off operating state and it prevents filling of the MR assembly with fluid through the main gap during assembly.

SUMMARY OF THE INVENTION

The invention provides for such a magneto-rheological damping assembly wherein the piston core and the internal pole segment define a closed auxiliary gap having an annular shape and extending axially between the electromagnets and radially between the core and the internal pole segment for preventing leakage of flux from the permanent magnets across the main gap when the assembly is in the off operating state.

The internal location of the auxiliary gap between the magnets allows for complete cancellation of the flux from the permanent magnets in the main gap when the assembly is in the off operating state. Complete cancellation of flux across the main gap advantageously allows the assembly to be filled with fluid through the main gap during assembly. Further, a lower minimum damping force is attainable when the assembly is operating in the off-operating state. An important characteristic related to MR devices is known as the "turn-up ratio" which is defined as the maximum damping force generated by the device divided by its minimum damping force (in the off operating state). It is generally desirable to have a high turn-up ratio such that the damper can fluctuate within a wide range of damping forces. Because complete cancellation of flux across the main gap is attainable, the invention provides for a higher turn-up ratio than the prior art. Furthermore, Because the auxiliary gap is located between the magnets, core and pole segment, it can easily be manufactured with different radial lengths, wherein the length corresponds to the damping range of the assembly. This is desirable because assemblies with a tuned damping range can easily be manufactured for various damping purposes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
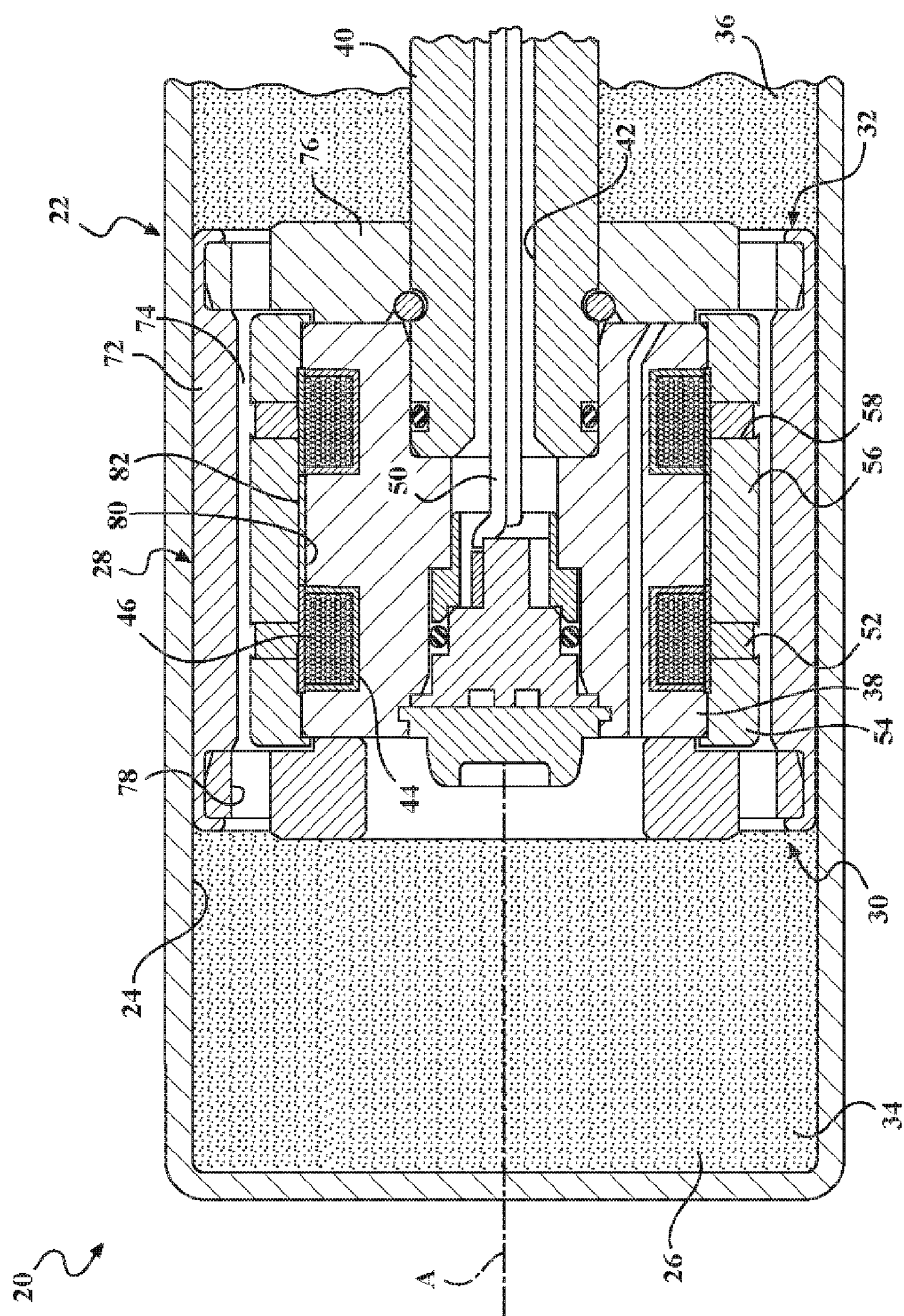
FIG. 1 is a side view of the magneto-rheological assembly.
Figure 2:
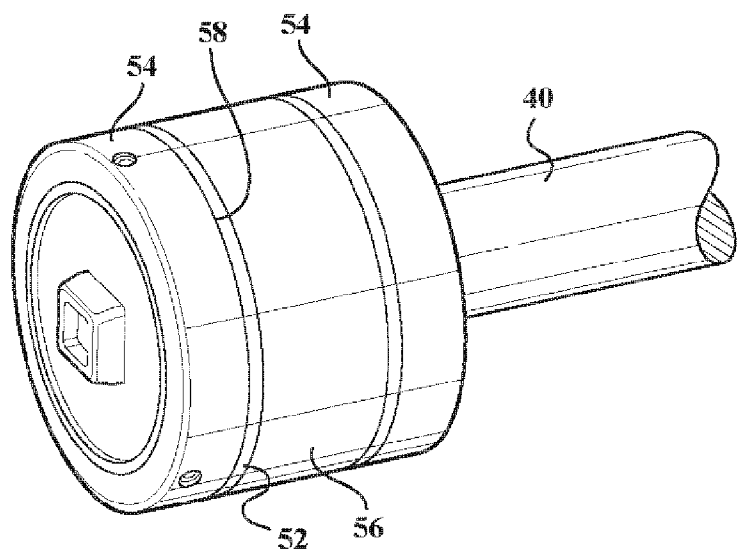
FIG. 2 is a perspective view of the pole segments, permanent magnets and piston rod.
Figure 3:
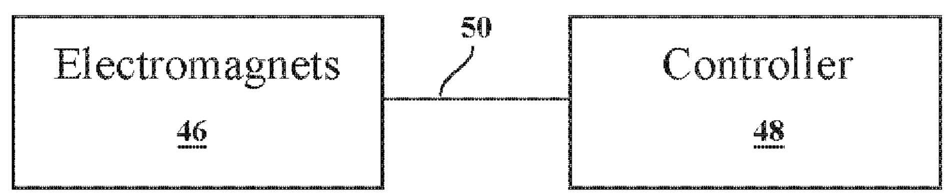
FIG. 3 is a schematic of the controller and electromagnet arrangement.

Referring to the Figures, wherein like numerals indicate corresponding parts throughout the several views, a magneto-rheological damping assembly 20 is generally shown.

The assembly 20 includes a cylindrical shaped housing 22 that extends along an axis A and presents an open interior 24 containing a magneto-rhological fluid 26. A cylindrical shaped piston 28 is slidably disposed is in the open interior 24 of the housing 22. It should be appreciated that the piston 28 and the housing 22 could have other cross-sectional shapes however they should correspond with and complement one another. The piston 28 has a compression end 30 and a rebound end 32 and the housing 22 defines a compression chamber 34 on the compression end 30 of the piston 28 and a rebound chamber 36 on the rebound end 32 of the piston 28.

The piston 28 defines a steel cylindrical shaped core 38. It should be appreciated that the core 38 could be constructed of other materials, however the chosen material should have a high magnetic permeability to provide for a low reluctance path for magnetic flux to travel. A piston rod 40 having a bore 42 extends axially from the piston core 38 on the rebound end 32 of the piston 28. A pair of axially spaced grooves 44 extend annularly about the core 38. An electromagnet 46 is disposed in each of the grooves 44 for selectively generating a magnetic flux. The electromagnets 46 are electrically connected to a controller 48 through a plurality of wires 50 that extend through the piston rod 40 bore 42 for controlling the magnetic flux generated by the electromagnets 46. Further, a permanent magnet 52, 152 is disposed annularly about each of the electromagnets 46 for generating a magnetic flux.

A pair of steel external pole segments 54, 154 and an internal pole segment 56, 156 are disposed bout the core 38 wherein the external pole segments 54, 154 are axially spaced from one another and the internal pole segment 56, 156 is disposed axially therebetween. Like the core 38, the pole segments 54, 154, 56, 156 are constructed of steel because of its high magnetic permeability which provides for a path of low reluctance for the magnetic flux from the magnets to travel, creating a desirable magnetic circuit in the piston 28. It should be appreciated that the pole segments 54, 154, 56, 156 could be constructed of other materials, however it should have a high magnetic permeability.

In the first enabling embodiment, the pole segments 54, 56 and permanent magnets 52 are each separate ring shaped components. During assembly of the piston 28, the pole segments 54, 56 and permanent magnets 52 are slid over the core 38 one after another such that the permanent magnets 52 are each sandwiched between the internal pole segment 56 and one of the external pole segments 54 in a pole void 58.

Figure 4:
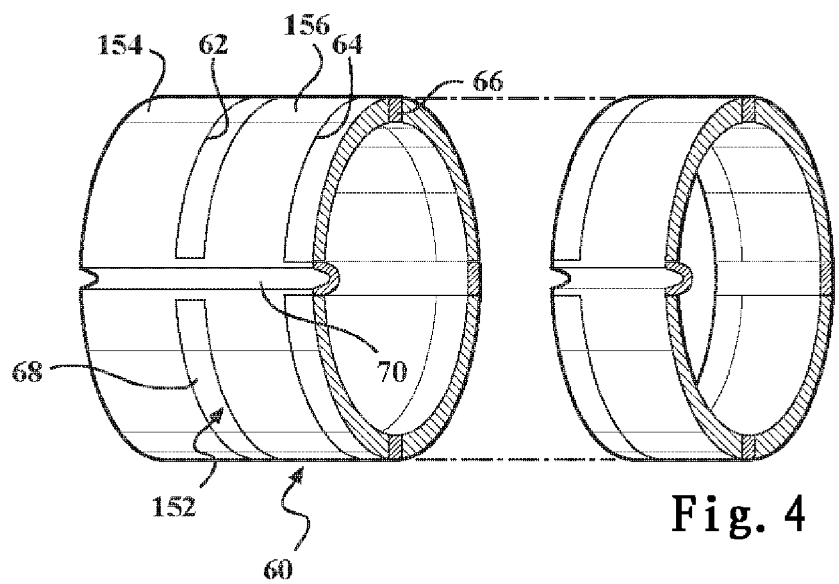
FIG. 4 is a side perspective and fragmentary view of the second enabling embodiment.

In a second enabling embodiment as best shown in FIG. 4 that is more feasible for production, the external pole segments 154 and the internal pole segments 156 are defined by a single integral pole cylinder 60. A first and a second set of four radial slots 62, 64 that are circumferentially spaced from one another by a plurality of webs 66 are machined into the cylinder, and each set of slots 62, 64 is axially aligned with one of the electromagnets 46. In this embodiment, each of the permanent magnets 152 is comprised of four magnet segments 68 and each of the magnet segments 68 is disposed in one of the radial slots 62, 64 of the pole cylinder 60. Further, the pole cylinder 60 further defines a by-pass groove 70 extending axially along the cylinder in two of the webs 66 that are axially aligned with one another. The purpose of the by-pass groove 70 is to provide a magnetic flux free zone for the fluid to pass when the piston 28 slides in the housing 22 at low speeds. During assembly, the magnet segments 68 are embedded into the slots 62, 64. To avoid handling magnetized segments 68, the magnet segments 68 are unmagnetized prior to being embedded in the slots, and are magnetized thereafter. The pole cylinder 60 is then press fitted over the core 38.

The piston 28 further includes a steel flux ring 72 disposed annularly about and radially spaced from the pole segments 54, 154, 56, 156 to define a main gap 74 through which the magneto-rheological fluid 26 is conveyed when the piston 28 slides in the housing 22. Like the core 38 and pole segments 54, 154, 56, 156 the flux ring 72 is constructed of steel to provide a path of low magnetic reluctance for the flux to travel. It should be appreciated that the flux ring 72 could be constructed of other materials having a high magnetic permeability. The flux generated from the magnets that passes across the main gap 74 raises the viscosity of the magneto-rheological fluid 26. The imparted damping force resisting the motion of the piston 28 depends on the viscosity of the fluid, such that an increase in the viscosity of the fluid leads to an increased damping force and a decrease in the viscosity of the fluid leads to a decreased damping force. The viscosity of the fluid can be changed by controlling the magnetic flux generated by the magnets 46, 52, 152 acting on the fluid in the main gap 74. It should be appreciated that the main gap could have various radial lengths to provide for different damping characteristics.

The piston 28 further includes an aluminum end plate 76 that engages the piston core 38, the flux ring 72 and the piston rod 40. The purpose of the end plate 76 is to hold the components in place. Because the end plate 76 is constructed of a non-magnetic aluminum material, it limits flux from exiting the piston 28. It should be appreciated that the end plate 76 could be constructed of other materials having a low magnetic permeability. Each of the end plates 76 includes an opening 78 that is disposed radially between the external pole segments 54 and the flux ring 72 and aligned with the main gap 74 to allow fluid to be conveyed between the main gap 74 and the housing 22.

Figure 7:
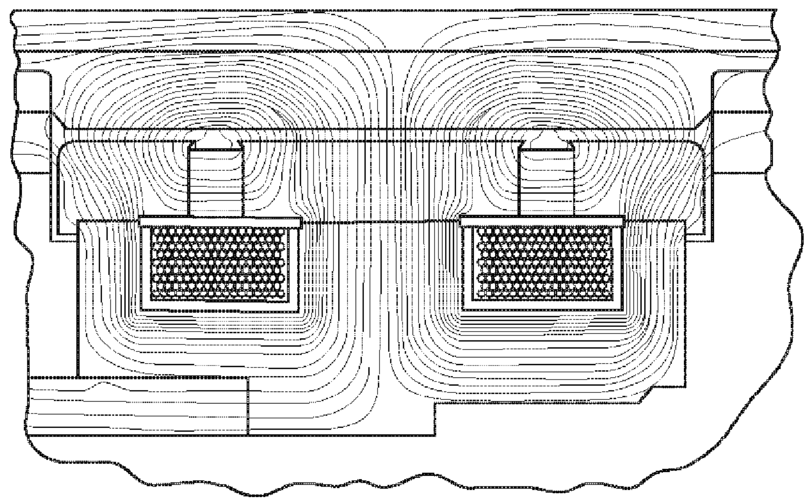
FIG. 7 is a side view of the magneto-rheological assembly when the controller is in the off state.
Figure 6:
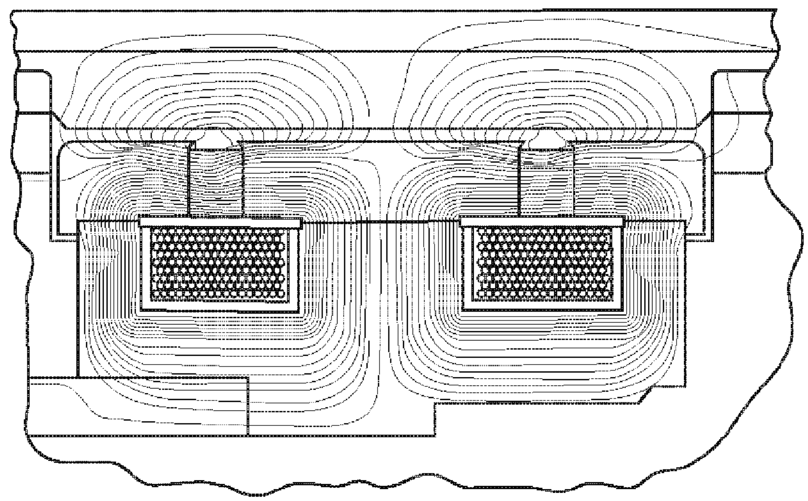
FIG. 6 is a side view of the magneto-rheological assembly when the controller is in the fail firm operating state.
Figure 5:
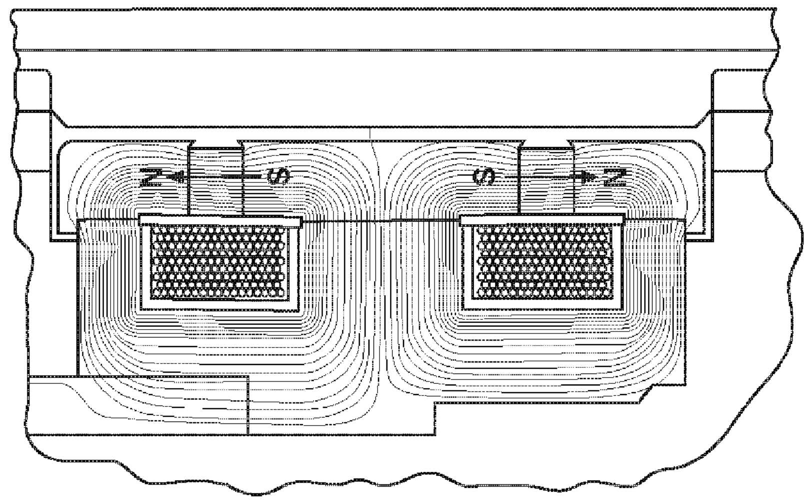
FIG. 5 is a side view of the magneto-rheological assembly when the controller is in the off operating state.

As best shown in FIGS. 5, 6, and 7, the controller 48 defines an off operating state, a fail firm operating state and an on operating state, all of which control the path and the amount of magnetic flux directed through the piston 28. When the off operating state is activated, a negative current is applied through the electromagnets 46 to cancel the flux from the permanent magnets 52, 152 across the main gap 74, resulting in a minimum damping force. When the fail firm operating state is selected, no current is applied through the electromagnets 46, such that only a flux from the permanent magnets 52, 152 crosses the main gap 74 resulting in a mid-level damping force. It is desirable to have a fail firm operating state because it provides for an above minimum level damping force in the event that power is lost to the electromagnets 46. When the on operating state is activated, a positive current is applied through the electromagnets 46 such that flux produced from the electromagnets 46 and the permanent magnets 52 crosses the main gap 74 resulting in a maximum damping force. It should be appreciated that the controller 48 can be operated at levels between the aforementioned operating states to provide for various levels of damping.

The piston core 38 and the internal pole segment 56, 156 define a closed auxiliary gap 80 having an annular shape extending axially between the electromagnets 46 and radially between the core 38 and the internal pole segment 56, 156. The auxiliary gap 80 could either be an air gap or it could be filled with another material, ideally one with a lower magnetic permeability than the core 38. In the first enabling embodiment, a non-magnetic stainless steel auxiliary gap ring 82 is disposed in the gap. During operation, the magnetic flux produced from the magnets 46, 52, 152 flows in two paths, either between the magnets across the auxiliary gap 80 into the core 38 of the piston 28 or across the main gap 74 to the flux ring 72. The auxiliary gap 80 provides for an area of increased reluctance in the flow path to the core 38 of the piston 28 such that more flux is biased toward traveling across the main gap 74 rather than through the core 38. This is a necessary element of the design because without the auxiliary gap 80, when the device is in the fail firm operating state, most of the flux would get short circuited into the core 38, leading to an undesirably small damping force. A problem associated with the prior art was that due to the location of the auxiliary gap, where an end extended outside of the piston, complete cancellation of flux was not possible in the off operating state because of flux leakage across the main gap. However, the closed location of the auxiliary gap 80 in the present invention between the magnets, core 38 and pole segments 54, 154, 56, 156 advantageously prevents leakage of flux across the main gap 74 when the assembly 20 is in the off operating state. This provides for a lower damping force in the off operating state and a higher turn-up ratio than that of the prior art. Further, it allows the assembly to be filled with fluid during assembly (a problem with the prior art). During filling of the assembly 20, the off operating state is activated by energizing the electromagnets 46 with a preset DC current.

Figure 8:
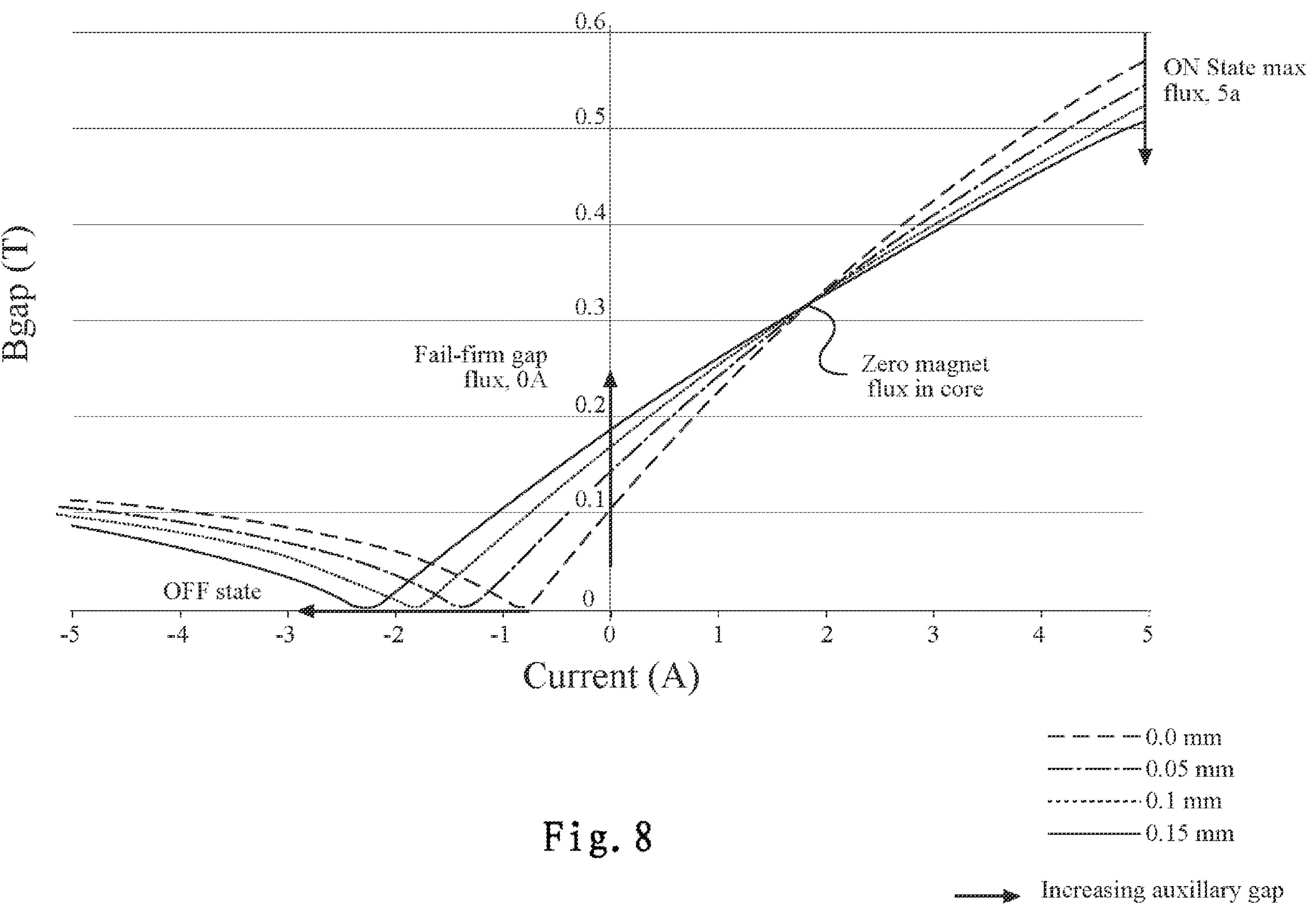
FIG. 8 is a graph of the flux density versus current characteristics of the magneto-rheological assembly.

The radial length of the auxiliary gap 80 is an important design parameter for the assembly 20. Because the auxiliary gap is located between the magnets 46, 52, 152, core 38 and pole segments 54, 154, 56, 156, it 80 can easily be manufactured with different radial lengths, wherein the length corresponds to the damping range of the assembly 20. This is desirable because assemblies 20 with a tuned damping range can easily be manufactured for various damping purposes. As shown in FIG. 8, the radial length of the auxiliary gap 80 determines the slope of the flux density versus current characteristics of the assembly 20. Increasing the radial length of the auxiliary gap 80 increases the magnitude of the required to be applied in the electromagnets 46 to achieve zero flux across the main gap 74 (off operating state). Further, increasing the radial length of the auxiliary gap 80 increases the flux density (corresponding to the damping force) across the main gap 74 when the assembly 20 is in the fail firm operating state. Furthermore, increasing the radial length of the main gap 74 decreases the flux density (corresponding to the damping force) across the main gap 74 when the assembly 20 is in the on operating state.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
|---|---|
| A | Axis |
| 20 | Assembly |
| 22 | Housing |
| 24 | open interior |
| 26 | magneto-rheological fluid |
| 28 | Piston |
| 30 | compression end |
| 32 | rebound end |
| 34 | compression chamber |
| 36 | rebound chamber |
| 38 | core |
| 40 | piston rod |
| 42 | bore |
| 44 | grooves |
| 46 | electromagnet |
| 48 | controller |
| 50 | wires |
| 52 | permanent magnet |
| 54 | external pole segments |
| 56 | internal pole segment |
| 58 | pole void |
| 60 | pole cylinder |
| 62 | first set of four radial slots |
| 64 | second set of four radial slots |
| 66 | webs |
| 68 | magnet segments |
| 70 | by-pass groove |
| 72 | flux ring |
| 74 | main gap |
| 76 | end plate |
| 78 | opening |
| 80 | auxiliary gap |
| 82 | auxiliary gap ring |

What is claimed is:

1. A magneto-rheological damping assembly comprising;

a piston extending along an axis and defining a compression end and a rebound end, said piston defining a core, a pair of electromagnets spaced axially from one another and disposed annularly about and engaging said core for selectively generating a magnetic flux, a permanent magnet disposed annularly about each of said electromagnets for generating a magnetic flux, an internal pole segment constructed of a material having a high magnetic permeability for concentrating the magnetic flux from said electromagnets and said permanent magnets disposed axially between said permanent magnets, said piston defining a main gap extending axially between said compression end and said rebound end of said piston and disposed adjacent said pole segment for conveying fluid through said piston wherein the flux from said magnets changes the viscosity of the fluid in said main gap, a controller for controlling the magnetic flux generated by said electromagnets, said controller defining an off operating state for applying a negative current through said electromagnets for cancelling the flux from said permanent magnets across said main gap, said piston core and said internal pole segment defining a closed auxiliary gap having an annular shape extending axially between said electromagnets and radially between said core and said internal pole segment for preventing leakage of flux from said permanent magnets across said main gap when said assembly is in said off operating state.

2. The assembly as set forth in claim 1 wherein an auxiliary gap ring constructed of a material having a low magnetic permeability is disposed in said auxiliary gap.

3. The assembly as set forth in claim 2 wherein said auxiliary gap ring is constructed of a non-magnetic stainless steel material.

4. The assembly as set forth in claim 2 wherein said core defines a pair of grooves extending annularly about said core and spaced axially from one another.

5. The assembly as set forth in claim 4 wherein each of said electromagnets is disposed in one of said grooves.

6. The assembly as set forth in claim 5 wherein said piston further includes a pair of external pole segments constructed of a material having a high magnetic permeability spaced axially from one another for concentrating the magnetic flux from said electromagnets and said permanent magnets.

7. The assembly as set forth in claim 6 wherein said internal pole segment is disposed axially between said external pole segments.

8. The assembly as set forth in claim 7 wherein said piston further defines a flux ring constructed of a material having a high magnetic permeability disposed annularly about and radially spaced from said pole segments to define said main gap.

9. The assembly as set forth in claim 8 wherein said piston further defines an end plate constructed of a non-magnetic aluminum material engaging said piston core and said flux ring and disposed at said ends of said piston.

10. The assembly as set forth in claim 9 wherein each of said end plates includes an opening disposed radially between said pole segments and said flux ring and aligned with said main gap.

11. The assembly as set forth in claim 10 wherein each of said external pole segments and said internal pole segment of said pole assembly are axially spaced to define a pole void therebetween.

12. The assembly as set forth in claim 11 wherein each of said permanent magnets has a ring shape and is sandwiched between one of said external pole segment and said internal pole segment in one of said pole voids.

13. The assembly as set forth in claim 10 wherein said external pole segments and said internal pole segments of said pole assembly are defined by an integral pole cylinder.

14. The assembly as set forth in claim 13 wherein said pole cylinder defines a first set of four radial slots circumferentially spaced from one another by a plurality of webs wherein said first set of radial slots is axially aligned with one of said electromagnets and a second set of four radial slots circumferentially spaced from one another by a plurality of webs wherein said second set of radial slots is axially aligned with the other of said electromagnets.

15. The assembly as set forth in claim 14 wherein each of said permanent magnets is comprised of four magnet segments and each of said magnet segments is disposed in one of said radial slots of said pole cylinder.

16. The assembly as set forth in claim 15 wherein said pole assembly defines a by-pass groove extending axially along said pole cylinder in two of said webs being axially aligned with one another.

17. A magneto-rheological damping assembly comprising;

a housing extending along an axis and having a cylindrical shape and presenting an open interior, a magneto-rheological fluid disposed in said open interior of said housing, a piston defining a compression end and a rebound end and slidably disposed in said open interior of said housing defining a compression chamber on said compression end of said piston and a rebound chamber on said rebound end of said piston, said piston defining a core having a cylindrical shape, a piston rod extending axially from said core on said rebound of said piston, said piston rod defining a bore, said core defining a pair of grooves extending annularly about said core and spaced axially from one another, an electromagnet disposed in each of said grooves for selectively generating a magnetic flux, a controller for controlling the magnetic flux generated by said electromagnets, a plurality of wires extending through said piston rod bore between said controller and said electromagnet for electrically connecting said electromagnets and said controller, a permanent magnet disposed annularly about each of said electromagnets for generating a magnetic flux, a pair of external pole segments constructed of a material having a high magnetic permeability for concentrating the magnetic flux from said electromagnets and said permanent magnets disposed about said core and spaced axially from one another, an internal pole segment constructed of a material having a high magnetic permeability for concentrating the magnetic flux from said electromagnets and said permanent magnets disposed axially between said external pole segments, said piston defining a flux ring constructed of a material having a high magnetic permeability disposed annularly about and radially spaced from said pole segments to define a main gap for conveying fluid through said piston wherein the flux from said magnets changes the viscosity of the fluid in said main gap, said piston further defining an end plate constructed of a non-magnetic aluminum material engaging said piston core and said flux ring and said piston rod disposed at said ends, of said piston, each of said end plates includes an opening disposed radially between said pole segments and said flux ring and aligned with said main gap, said controller defining an off operating state for applying a negative current through said electromagnets for canceling the flux from said permanent magnets across said main gap and a fail firm operating state for preventing current through said electromagnets and an on state for applying a positive current through said electromagnets for inducing a flux across said main gap, said piston core and said internal pole segment defining a closed auxiliary gap having an annular shape extending axially between said electromagnets and radially between said core and said internal pole segment for preventing leakage of flux from said permanent magnets across said main gap when said assembly is in said off operating state, and an auxiliary gap ring of a non-magnetic stainless steel material disposed in said auxiliary gap.

18. The assembly as set forth in claim 17 wherein each of said external pole segments and said internal pole segments are axially spaced define a pole void therebetween, each of said permanent magnets has a ring shape and is sandwiched between one of said external pole segments and said internal pole segment in said annular void.

19. The assembly as set forth in claim 17 wherein said external pole segments and said internal pole segments are defined by an integral pole cylinder, said pole cylinder defines a first set of four radial slots circumferentially spaced from one another by a plurality of webs wherein said first set of radial slots is axially aligned with one of said electromagnets and a second set of four radial slots circumferentially spaced from one another by a plurality of webs wherein said second set of radial slots is axially aligned with the other of said electromagnets.

each of said permanent magnets is comprised of four magnet segments wherein each of said magnet segments is disposed in one of said radial slots of said pole cylinder, said pole cylinder defines a by-pass groove extending axially along said cylinder in two of said webs being axially aligned with one another.

* * * * *